US011877342B2

(12) United States Patent
Kinsey et al.

(10) Patent No.: US 11,877,342 B2
(45) Date of Patent: Jan. 16, 2024

(54) TEMPORARY ASSIGNMENT OF EMERGENCY ROUTE BACK

(71) Applicant: T-Mobile USA, Inc., Bellevue, WA (US)

(72) Inventors: Michele Kinsey, Shoreline, WA (US); Adrian T. Synal, Kirkland, WA (US); William Michael Hooker, Seattle, WA (US); Mohammed Al-Mehdar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 273 days.

(21) Appl. No.: 17/190,233

(22) Filed: Mar. 2, 2021

(65) Prior Publication Data

US 2021/0282217 A1 Sep. 9, 2021

Related U.S. Application Data

(60) Provisional application No. 62/985,816, filed on Mar. 5, 2020.

(51) Int. Cl.
*H04W 4/00* (2018.01)
*H04W 76/50* (2018.01)
(Continued)

(52) U.S. Cl.
CPC ............. *H04W 76/50* (2018.02); *H04W 4/90* (2018.02); *H04W 76/11* (2018.02); *H04W 76/34* (2018.02)

(58) Field of Classification Search
CPC ....... H04W 76/50; H04W 4/90; H04W 76/11; H04W 76/34
See application file for complete search history.

(56) References Cited

U.S. PATENT DOCUMENTS 5,712,900 A 1/1998 Maupin et al.
9,503,577 B1 * 11/2016 Bendi ................ H04M 3/42102
(Continued)

OTHER PUBLICATIONS

Gallagher, Jill C., "Next Generation 911 Technologies: Select Issues for Congress", Congressional Research Service, Report # R45253, Jul. 9, 2018, 14 pages.
(Continued)

*Primary Examiner* — Omoniyi Obayanju
(74) *Attorney, Agent, or Firm* — Lee & Hayes, P.C.

(57) ABSTRACT

An emergency route back number (ERBN) may be assigned for use in emergency calls. A telecommunication network associated that may be associated with a wireless service provider, may identify an emergency call directed to an emergency number (e.g., 9-1-1) that originated from a device that is not associated with a unique phone number such as a shared line, or a communication that utilizes some other indicator to establish the emergency call (e.g., an email address, or some other identifier). When an emergency call is detected that does not have a dedicated phone number, an ERBN is assigned to the communication. This ERBN may be reserved for some period of time after the emergency call ends such that emergency contact centers are able to reach callers back in case of dropped calls, fails, and/or additional emergency services that may need to reach the callers directly.

18 Claims, 9 Drawing Sheets

(51) Int. Cl.
      *H04W 76/11*     (2018.01)
      *H04W 76/34*     (2018.01)
      *H04W 4/90*      (2018.01)

(56)           References Cited

U.S. PATENT DOCUMENTS

| | | | |
|---|---|---|---|
| 10,735,593 B1* | 8/2020 | Dinsing | H04L 51/046 |
| 2014/0307858 A1* | 10/2014 | Li | H04M 3/42008 379/37 |
| 2021/0282218 A1 | 9/2021 | Kinsey et al. | |

OTHER PUBLICATIONS

Nena, "NG9-1-1 Tutorial", available at <<https://cdn.ymaws.com/www.nena.org/resource/resmgr/hg9-1-1_project/2011_9-1-1_tutorial_v4.1.pptx>>, Mar. 6, 2011, 53 pages.

Police Executive Research Forum, "The Revolution in Emergency Communications", available at <<http://www.policeforum.org/assets/EmergencyCommunications.pdf>>, Nov. 2017, 94 pages.

Office Action for U.S. Appl. No. 17/190,272, dated Jan. 26, 2023, Kinsey, "Text Based 911 Communication", 16 pages.

Office Action for U.S. Appl. No. 17/190,272, dated Apr. 22, 2022, Kinsey, "Text Based 911 Communication", 13 pages.

Office Action for U.S. Appl. No. 17/190,272, dated Sep. 12, 2022, Michele Kinsey, "Text Based 911 Communication", 14 pages.

\* cited by examiner

TEMPORARY ASSIGNMENT OF EMERGENCY ROUTE BACK

RELATED APPLICATIONS

This application claims the benefit of priority to provisional U.S. Patent Application Ser. No. 62/985,816, filed on Mar. 5, 2020, and entitled "Temporary Assignment of Emergency Route Back Number", which is incorporated by reference in entirety.

BACKGROUND

In the case of an emergency, an individual may call a designated emergency number, such as "9-1-1" in the United States, or if located in other parts of the world a different emergency number. In the United States and Canada, dialing "9-1-1" from a telephone links the caller to an emergency contact center, which may be referred to as a Public Safety Answering Point (PSAP). In many cases, the location and telephone number of the caller may automatically be identified by the PSAP. In some cases, however, the location and/or telephone number of the caller may not be determined. For instance, an individual may be calling from a device that does not have an associated telephone number and/or the user may be calling from a shared line that uses the same telephone number regardless of where the users are located. For example, a shared line may be used by users in Seattle, Austin, as well as other locations. In these scenarios, if the call is disconnected, the PSAP is not able to call the user back.

BRIEF DESCRIPTION OF THE DRAWINGS

The detailed description is set forth with reference to the accompanying figures.

DETAILED DESCRIPTION

Figure 1:
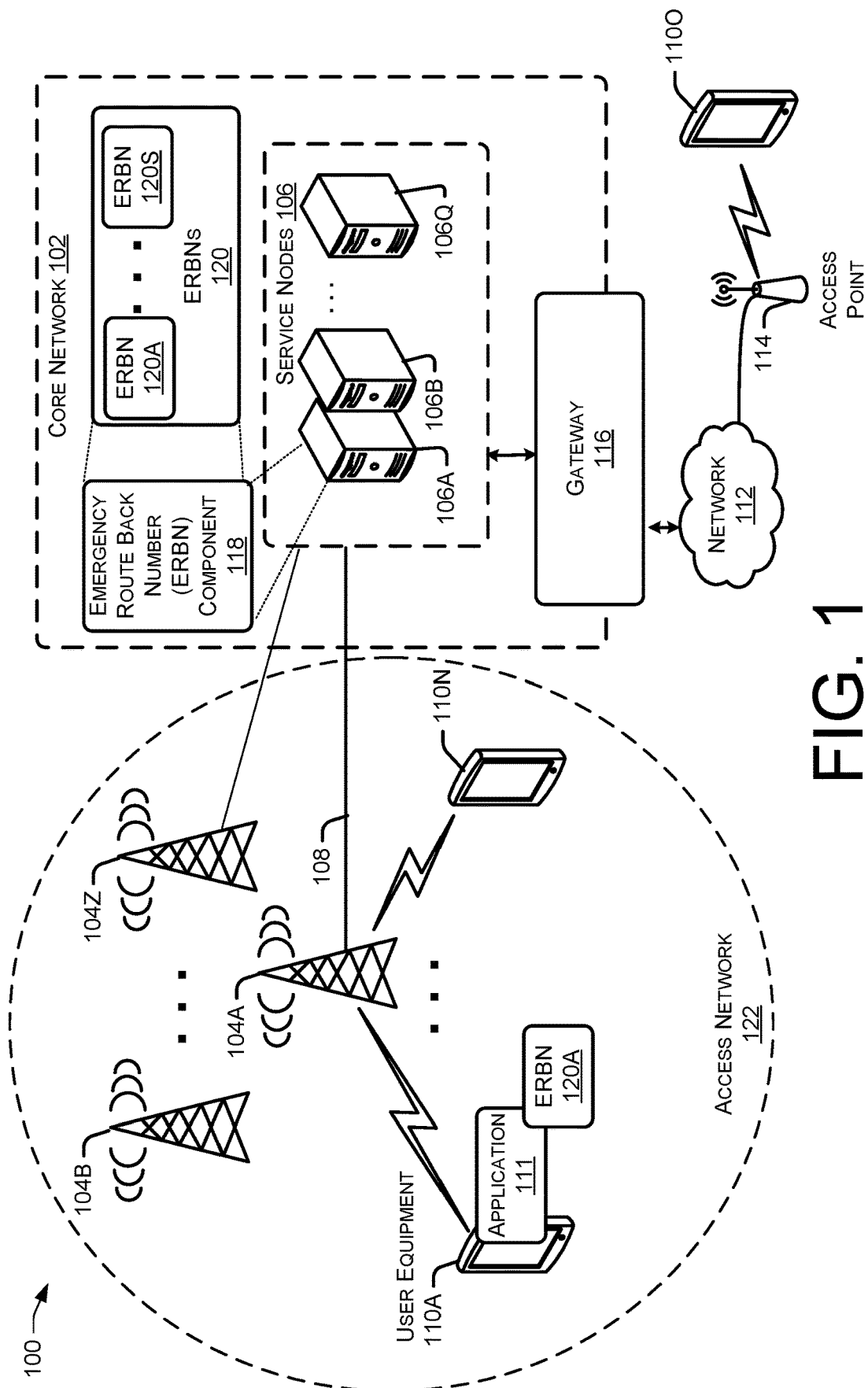
FIG. 1 is a block diagram showing an illustrative environment for temporary assignment of an emergency route back number (ERBN).

Described herein are techniques and systems for temporarily assigning a telephone number (which may be referred to herein as an "emergency route back number (ERBN)") that may be used to call back a user that has made an emergency call. Using techniques described herein, a network, such as a telecommunication network associated with a wireless service provider, may identify a call directed to an emergency contact center (e.g., 9-1-1) (which may be referred to herein as an "emergency call") that originated from a device that is not associated with a telephone number that does not have a dedicated phone number. As used herein, a "dedicated phone number" is associated with a single device. For example, if a user utilizes a number that is not unique to the device, such as a shared line, then that number is not considered a dedicated phone number.

In some configurations, when an emergency call is identified by the telecommunications network as originating from a non-dedicated phone number (e.g., a shared line), an ERBN is assigned to the communication. The ERBN acts as a dedicated phone number for the device originating the call for a configurable period of time. By temporarily assigning the ERBN, emergency contact centers (e.g., PSAPs) can reach callers back in case of dropped calls, fails, and/or additional emergency services that may need to reach the callers directly.

There are many reasons a user may not be associated with a dedicated phone number that does not uniquely identify the user. For example, the user may be using a shared line (hunt group or ring group number) that is used by multiple users, or the user may be using a device that does not have an associated telephone number. In some examples, the communications may be over the top communications (OTT) that operate over the Internet and may be received from clients can be serviced by devices such as tablets, desktop and other devices that do not require Subscriber Identity Modules (SIMs) to function over telecom networks. This means these devices do not have a native dialer.

As such, when an emergency call is received from a device that does not have a dedicated number, and instead has an alpha numeric calling ID, a shared number, or some other identifier, an ERBN that acts as a dedicated phone number may be temporarily assigned. For emergency services to handle the emergency call a dedicated number is utilized so that emergency services can return calls and utilize the numbers for reference purposes.

When the emergency services receive the incoming emergency call, the temporarily assigned ERBN may be provided to the emergency contact center. The originator of the emergency call may also be informed of the ERBN assigned to the device during the call out as the network would supply it back to the client. For example, if the caller is provided with the ERBN, the caller may provide the ERBN to the emergency services when requested. In some configuration, the ERBN is temporarily associated with the caller during the duration of the ongoing call and some period of time thereafter (e.g., 5 minutes, 10 minutes, 20 minutes, . . . ).

According to some examples, an emergency route back number (ERBN) component associated with the telecommunications system reserves the ERBN number until the timer/duration has expired to be used for this user. In some instances, the time to reserve the number is not a hard limit. According to some configurations, the timer starts after an emergency call has ended. In this way, the ERBN remains alive/mapped to the user making the emergency call in case emergency services need to contact the caller back again at some point after the emergency call has terminated.

In some configurations, if the user who has this number reserved/mapped to their profile and their device IDs (Universal Unique Identifier (UUID)) and makes another 911 call; then the timer for the reserved ERBN gets restarted. This timer may restart each time the user calls back out to 911 and/or receives a call back from the PSAP. This is to help to keep the ERBN alive for the immediate need of the emergency.

If after the expiry of ERBN that was reserved against that device of the user and the user makes another emergency call the reserved number that was previously utilized can be redistributed to that user and or a new number can be reserved for that user. In some examples, an ERBN that was reserved, and is now released, may be put back for use by another emergency caller. According to some examples, the ERBN may be re-assigned after some further time period (e.g., when EBRN is put back in a pool of available ERBNs, the ERBN is not re-assigned immediately to another user). More details are provided below with reference to FIGS. 1-6.

FIG. 1 is a block diagram that shows an illustrative environment 100 for temporary assignment of an emergency route back number (ERBN) and use of the ERBN. Referring to FIG. 1, the environment 100 may include a core network 102 and an access network 122 that is associated with a wireless service provider. The environment 100 is illustrated in simplified form and may include many more components.

The environment 100 may include nodes 104, such as nodes 104A-104Z, which may also be referred to herein as "cells". The nodes 104 may be wireless nodes or wired nodes that are coupled to core network 102 and/or some other network. The environment 100 may also include one or more access points 114, one or more gateways 116, and one or more service nodes 106. A node, such as a node 104 may handle traffic and signals between electronic devices, such as the user equipment 110A-110N, and a core network 102. For example, a node 104 may perform the transcoding of speech channels, allocation of radio channels to electronic devices, paging, transmission and reception of voice and data, as well as other functions. A node 104 may include several base transceiver stations (BTS), each BTS may include a transceiver, antenna, and additional network switch and control equipment that provide a network cell for facilitating wireless communication between UE computing devices and the core network 102. In some examples, the nodes 104 include a gNodeB and/or an eNodeB.

The core network 102 and/or some other component may be responsible for performing functionality relating to temporary assignment of an emergency route back number (ERBN) 120, routing voice communication to other networks, as well as routing data communication to external packet switched networks, such as the Internet 112. For example, the one or more service nodes 106 may be a Gateway GPRS Support Node (GGSN) or another equivalent node. According to some configurations, the one or more service nodes also include a Policy and Charging Rules Function (PCRF) node that utilized to enforce policy rules of the network. The PCRF node can be configured to automatically make policy decisions for each subscriber (e.g., each user equipment (UE) 110 which may also be referred to herein as "user equipment") active on the network. For example, the PCRF may be utilized to allocate bandwidth of the network as well as provide different levels of service to different computing devices on the network. Additionally, some data can be prioritized within the network.

The user equipment 110 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 122, and/or over a Wi-Fi network, or some other type of network.

In some instances, the UE 110 computing devices can be configured to send and receive data using any wired or wireless protocols. Additional examples of the UE 110 include, but are not limited to, smart devices such as televisions, music players, or any other electronic appliances that can generate, request, receive, transmit, or exchange voice, video, and/or digital data over a network. The UE 110 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

In some configurations, one or more of the service nodes 106 may be configured as one or more application servers that provide support for one more applications, such as application 111 utilized by one or more user equipment 110 computing devices. Some example applications include, but are not limited to browser applications, messaging applications, voice applications (e.g., Voice over Internet Protocol "VoIP" applications), video applications, and the like.

While the service nodes 106 are illustrated within the core network 102, one or more other computing devices may be located outside of the core network 102. For example, an application server, or some other server or device, may be connected to the core network 102 via one or more external packet switched networks, such as the Internet. In some examples, one or more computing devices outside of the core network 102 may be utilized to perform processing related to utilizing ERBNs.

According to some configurations, a telephony client application, such as application 111, on the UE 110A may establish data communication with the network 102 through a data connection to the node 104A. The node 104A may be a node that routes a communication wired/wirelessly from the UE 110A through the access network 122 for communication to the core network 102.

When a communication request arrives at the network 102, one or more of the service nodes 106 may determine the identity of the originating computing device for the communication (e.g., using a telephone number, IMEI, IMSI, IP address) as well as the identity of the computing devices to send the communication. According to some configurations, a UE 1100 may connect to the service nodes 106, or some other component such as an application server, via the Internet 112. In such instances, the UE 1100 may connect to the Internet 112 via Wi-Fi access point 114. Accordingly, data traffic from the UE 1100 may be routed to the service nodes 106 by the gateway 116 of the network 102.

In some configurations, a wireless service provider may utilize alternative access vendor (AAV) networks, for example, which utilize Ethernet networks to provide a wired connection, such as wired connection 108, to provide at least a portion of backhaul for broadband cellular services, such as 5G networks. In other examples, the wireless service provider may deploy its own wired connections.

In general, a node 104 can be implemented as a variety of technologies to provide wired and/or wireless access to the network, as discussed herein. In some instances, the nodes 104 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the nodes 104 can include any number and type of transceivers and/or base stations representing any number and type of macrocells, microcells, picocells, or femtocells, for example, with any type or amount of overlapping coverage or mutually exclusive coverage. The nodes 104 can be associated with access network 122.

As shown in FIG. 1, some nodes 104 have no physical (i.e., "wired") data connection to network. In other words, some of the nodes, such as node 104B, are not connected to the core network 102 using fiber cabling, copper cabling, and/or some other type of wired connection. The nodes 104 that do not have a wired connection may be connected to one or more wired nodes 104, such as node 104A, that does have a wired connection to the core network 102. A wired node utilizes fiber, or other wired data connections, to connect to the core network 102. As shown, wired node 104A connects to the core network via an Ethernet connection 108 via a fiber optic, coaxial, or other high speed wired data connection. A wired node 104, such as node 104A, could also be connected by a coaxial, T1, T3, or other suitable high-speed connection to the core network 102. In some configurations, mesh networking technology can be used to connect different nodes 104 within the access network 122. Geographic Information Services (GIS) and other terrain and location information systems can be used to determine nodes to provide a connection between one or more non-wired nodes and a network 102.

In some instances, the environment 100 can further include one or more servers, including service nodes 106, to facilitate communications by and between the various devices in the environment 100 and perform operations relating to assignment of ERBNs. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/ LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 110, the nodes 104, and one or more endpoints of the network (e.g., service nodes 106A-106Q, websites, etc.). While FIG. 1 illustrates an example environment 100, it is understood in the context of this document, that the techniques discussed herein may also be implemented in other networking technologies.

The access network 122 can be any sort of access network, such as a GSM or UMTS network. The access network 122 can include any aspects of one or more of second, third, fourth generation, and fifth generation (2G, 3G, 4G, and 5G) cellular-wireless access technologies. The access network 122 can also be referred to as a universal terrestrial radio network (UTRAN) or a GSM EDGE radio access network (GERAN) and can include one or base stations, as well as a radio network controller (RNC). As briefly discussed above, a network, such as an access network 122 associated with a wireless telecommunication service provider, As illustrated, the one or more service nodes 106 includes an emergency route back number (ERBN) component 118 configured to perform operations relating to temporary assignment of an emergency route back number (ERBN) 120. In the example illustrated in FIG. 1, the UE 110A initially connects to node 104A and the UE 110 does not have a dedicated number (e.g., an e.164 number) and is making an emergency call (e.g., 9-1-1). An e.164 number follows the international telephone numbering plan that ensures that each device on the public switched telephone network (PSTN) has globally unique number. This e.164 number allows phone calls and text messages to be correctly routed to individual phones in different countries. In the current example, the emergency route back number component 118 may temporarily assign an ERBN 120 to the user equipment 110A that is associated with the user making the emergency call.

According to some configurations, the emergency route back number component 118 utilizes a pool of ERBNs 120 when temporarily assigning an ERBN 120 to the emergency caller. For example, using techniques described herein, a network, such as a telecommunication network associated with a wireless service provider, may identify a call directed to an emergency number (e.g., 9-1-1) that originated from a device that is not associated with a dedicated phone number. In some configurations, when an emergency call is detected that originates from a device that does not have a dedicated phone number, such as UE 110A that does not have a dedicated e.164 number, the ERBN component 118 may assign an ERBN, such as ERBN 120A, to the device. In some examples, the ERBN component 118 selects the ERBN 120A from a pool of available ERBNs 120. In other examples, the ERBN component 118 may generate a unique ERBN.

After assigning the ERBN number, the ERBN may be provided and utilized by the emergency service as a dedicated number that is associated with the user equipment 110 originating the call. The originator of the emergency call may also be informed of the ERBN by the ERBN component 118. In this way, the user of UE 110A may provide the ERBN to emergency service personnel when requested. In some configurations, the ERBN is temporarily associated with the caller utilizing user equipment 110A during the duration of the ongoing call and some period of time thereafter (e.g., 5 minutes, 10 minutes, 20 minutes, . . . ).

An ERBN component 118 associated with the telecommunications system reserves the ERBN number 120A until the timer/duration has expired to be used for this user. In some examples, the time to reserve the number is not a hard limit. According to some configurations, the timer is started by the ERBN component 118 after an emergency call has ended. In this way, the ERBN 120A remains alive/mapped to the user making the emergency call in case emergency services need to contact the caller back again. In some configurations, if the user who has this number reserved/ mapped to their profile and their device IDs (Universal Unique Identifier (UUID)) and makes another 911 call; then the timer for the reserved ERBN gets restarted. This timer would restart each time they call back out to 911 and or receive a call back. This is to help to keep the ERBN alive for the immediate need of the emergency.

If after the expiry of ERBN that was reserved against the UE 110A, and the user makes another emergency call, the reserved ERBN that was previously utilized can be redistributed to that user and or a new number can be reserved for that user. In some examples, an ERBN that was reserved, and is now released, may be put back for use by another emergency caller. According to some examples, the ERBN may be re-assigned after some further time period (e.g., when EBRN is put back in a pool of available ERBNs, the ERBN is not re-assigned immediately to another user). More details are provided below with regard to FIGS. 2-6.

Figure 2A:
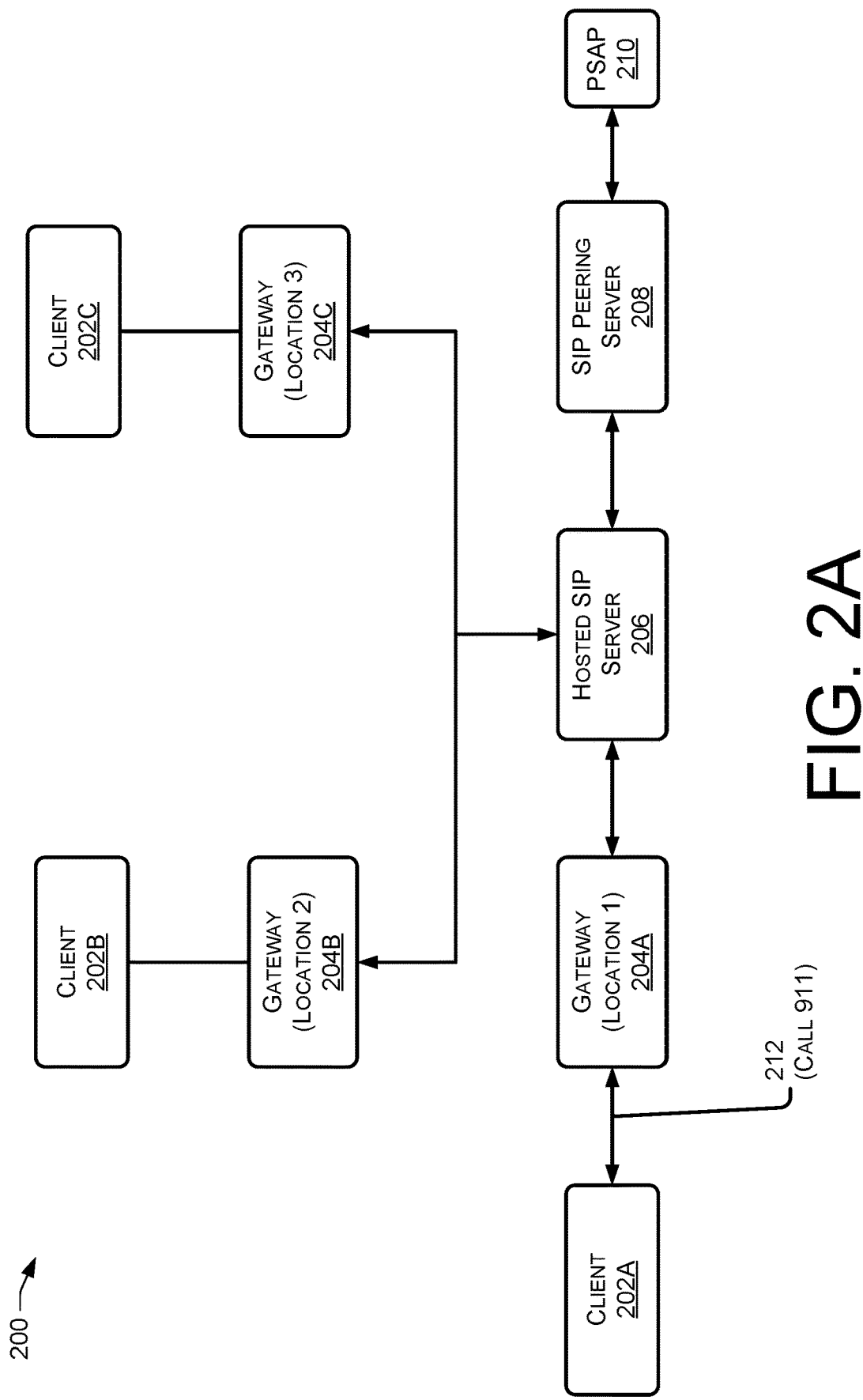
FIGS. 2A and 2B are block diagrams showing illustrative environments for associating an ERBN.
Figure 2B:
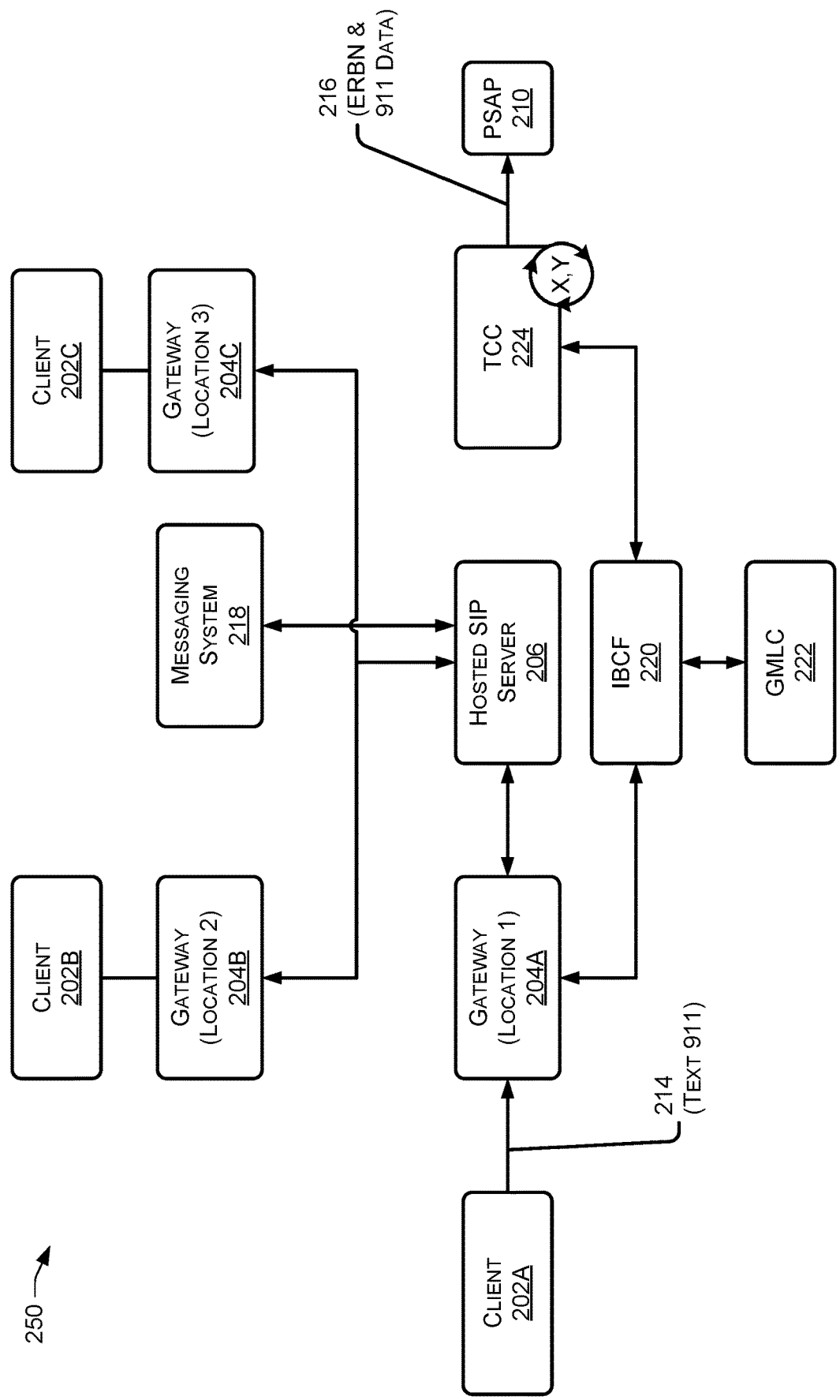

FIGS. 2A and 2B are block diagrams showing illustrative environments 200 and 250 for associating an ERBN. As discussed above, a client 202, such as UE 110A, may not have a dedicated e.164, and instead utilizes an alpha numeric calling ID or a shared number. For emergency services, such as PSAP 210, to handle and emergency call, a dedicated number is utilized so that emergency services can return calls and utilize the numbers for reference purposes. As illustrated, FIG. 2A shows an example of over the top client's 202A-202C route towards an associated signaling/media gateway 204A-204C and then communicate to a server, such as SIP server 206, that may generate and map/reserve the ERBN for that caller associated with a client.

According to some configurations, the SIP server 206 may communicate with application servers, such as one or more service nodes 106, that may utilize a device ID(s) reference to map and hold/reserve an ERBN 120 in order for an emergency service to call/reach back to reach the user that originated the emergency call.

As discussed above, when a client 202, such as client 202 makes a call 212 to emergency services, the server 206 may associate an ERBN 120 with the device of the client 202A. in some examples, the ERBN component 118 of server 206, or located at some other location, obtains an available ERBN 120 from a pool of ERBNs 120. In some configurations, the server 206, or some other device or component, may also set a timer for a configurable period of time such that the ERBN assigned to the client 202A that does not have a dedicated number can be reached in case a communication to the PSAP 210 is dropped and/or the user needs to be contacted. According to some examples, the server 206 starts the timer after the call has been ended.

When a PSAP 210 associated with the emergency services receives the incoming emergency call, the temporarily assigned ERBN which has been associated with client 202A may be presented (e.g., via a display, audibly, or some other user interface) to the emergency services personnel handling the call.

The originator of the emergency call, such as client 202A, may also be informed of the assigned ERBN 120 by the ERBN component 118, or some other component or device. The server 206, or some other device or component, may continue to reserve the ERBN for some period of time. For example, until the timer/duration has expired for the particular emergency call (e.g., 10, 20, 40 mins, which can be modified to be longer/shorter not a hard limit). The timer may start during the call, after the call, or at some other time in order such that the ERBN 120 stays alive/mapped to that user in case emergency services need to contact the caller back again. If the user who has this ERBN reserved/mapped to their profile and their device IDs (UUID) and makes another 911 call, then the timer for the reserved ERBN may restart. This timer may be restarted each time they call back out to 911 and or receive a call back. This is to help to keep the number alive for the immediate need of the emergency.

If after the expiry of the ERBN and a client 202 makes another emergency call the reserved ERBN that was previously utilized can be redistributed by the ERBN component 118 of server 206 to that user or a new number can be reserved for that user. In some examples, there is a period of time (i.e., a grace period) that restricts distributing a recently reserved number for at least some period of time when the ERBN is put back in the pool.

Referring to FIG. 2B, a client 202A is utilizing an electronic message, such as a text message 214 to contact PSAP 210. When the PSAP 210 associated with the emergency services receives the incoming text message, the ERBN associated with client 202A may be presented as data 216. The client 202A that originated the emergency message may also be provided the assigned ERBN. As discussed, in some examples, the ERBN is temporarily associated with a device of the client 202A by the server 206 during the duration of the ongoing conversation (messaging).

As illustrated, a gateway, such as gateway 202A may request the ERBN from server 206. The gateway 202A may be connected to an Interconnection Border Control Function (IBCF) 216. The IBCF 216 may be used as a gateway to external networks, such as a network associated with the emergency services. A text control center (TCC) 224 may be connected to the IBCF 220 that may be configured to receive messages, such as but not limited to short message short message service (SMS) messages, multimedia messaging service (MMS) messages, and possibly other type of messages. The ERBN and data of the electronic message 214 may be sent to the PSAP 210 via the IBCF 220 and the TCC 224. The Gateway Mobile Location Center (GMLC) 222 may be configured to provide location-based services (LBS). For example, the GMLC 222 may be configured to provide a location of the client 202A originating the emergency text to the emergency services.

The server 206 and/or some other device or component may continue to reserve the ERBN for the client 202A until the timer/duration has expired (e.g., 10, 20, 40 mins, which can be modified to be longer/shorter not a hard limit). The timer may be started by the server 206 after the initial message and first response has ended to keep the number alive/mapped to that user in case the emergency services need to contact the user back again. If the user who has this number reserved/mapped to their profile and their device IDs (UUID) and makes another 911 call or message; then the timer for the reserved ERBN may be restarted. This timer may be restarted each time they reply back out to 911 and/or receive a direct message back from the PSAP 202. This is to help to keep the number alive for the immediate need of the emergency.

If after the expiry of that number that was reserved against that user and the subscriber makes another emergency text, the reserved number that was previously utilized can be redistributed to that user and or a new number can be reserved for that user. In some cases, there is a grace period of this number and when the number is put back in the pool it is not re-assigned immediately to another user.

Figure 3A:
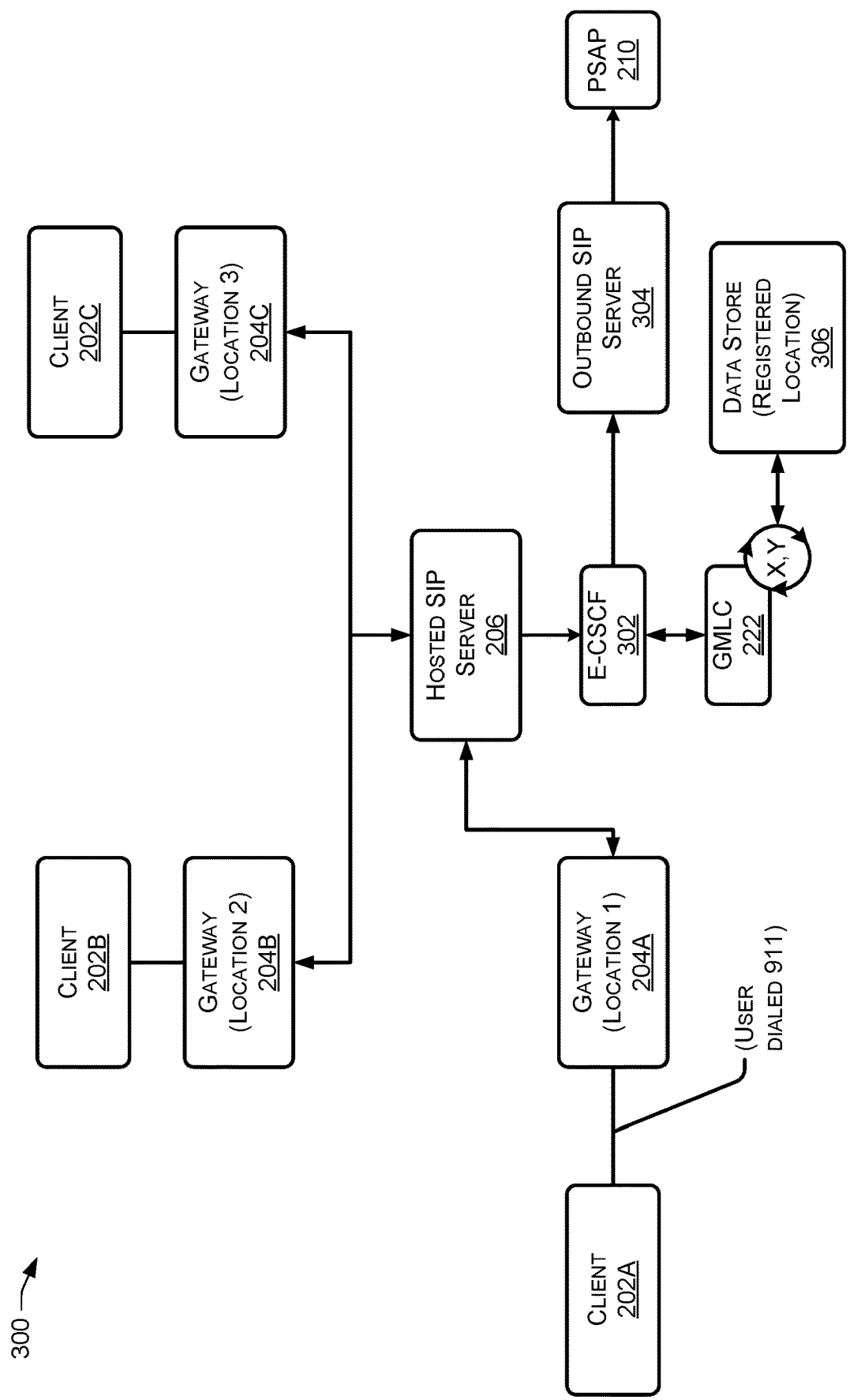
FIGS. 3A and 3B are block diagrams showing illustrative environments for a Public Safety Answering Point (PSAP) calling back an individual that has been assigned an ERBN.
Figure 3B:
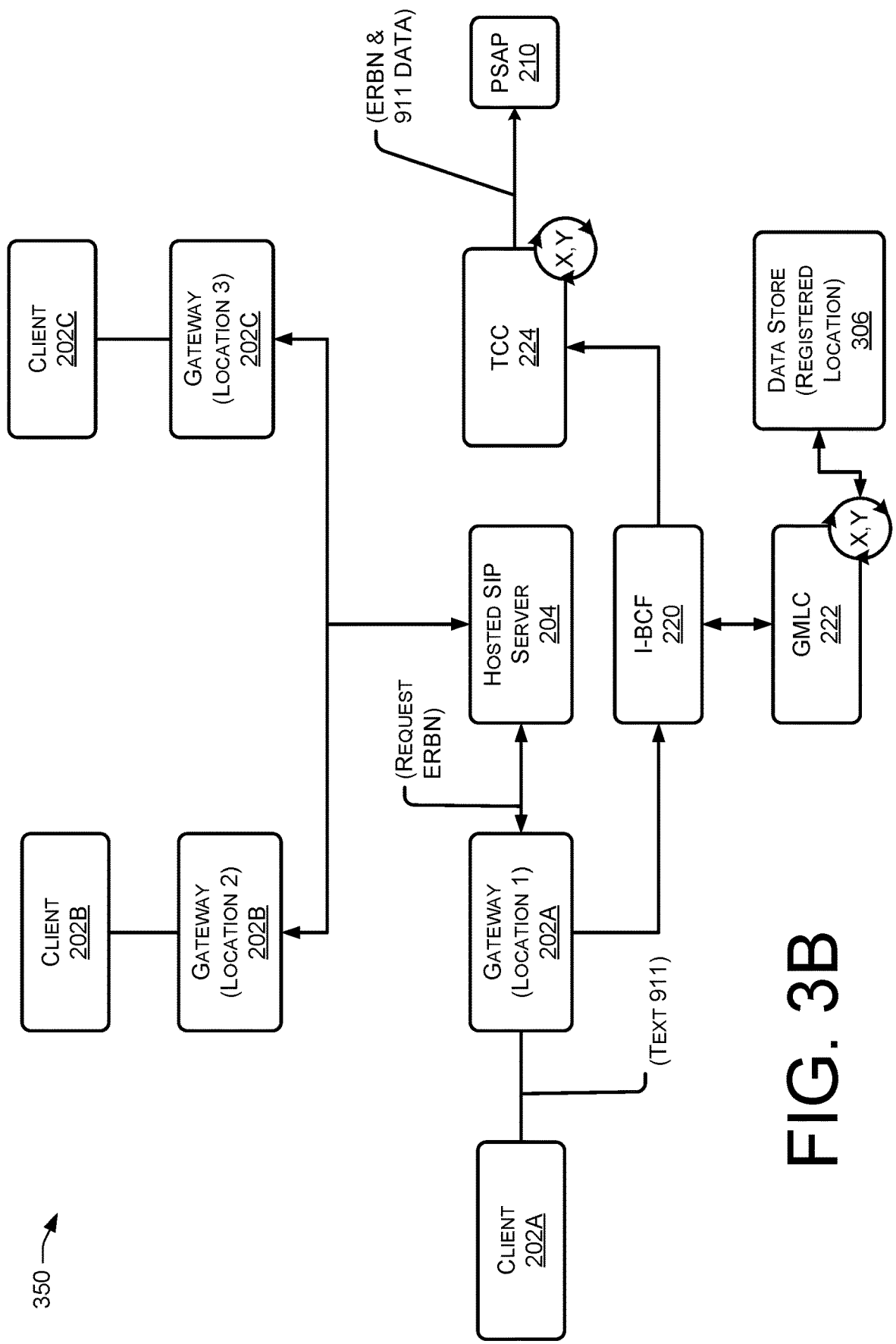

FIGS. 3A and 3B are block diagrams showing illustrative environments 300 and 350 for associating an ERBN with a device that does not have a dedicated phone number. As illustrated, the environment 300 shows a call flow that originates from a client 202 and flows to the PSAP 210 and the environment 350 shows a message flows that originates from a client 202 and flows to the PSAP 210. FIGS. 3A and 3B include more detail as compared to FIGS. 2A and 2B.

As illustrated in FIG. 3A, environment 300 includes Emergency Call Session Control Function (E-CSCF) 302 that is configured to be utilized for emergency calls between clients 202 and PSAP 210. When communicating with the PSAP 210, the E-CSCF 302 is configured to replace emergency identifiers with the actual PSAP Session Initiation Protocol (SIP) Uniform Resource Identifier (URI) such that communications from the client 202 reach the PSAP 210. In some examples, if location information for the client 202, such as client 202A was not provided, the E-CSCF 302 will query the GMLC 222 that may obtain the registered location of the client 202 from the data store 306. The E-CSCF 302 may then communicate with the outbound SIP server 304 that connects the emergency call to the PSAP 210. FIG. 3B is similar to FIG. 2B but includes GMLC 222 coupled to data store 306 that may configured to retrieve location information for client 202A, and other clients 202.

Figure 4A:
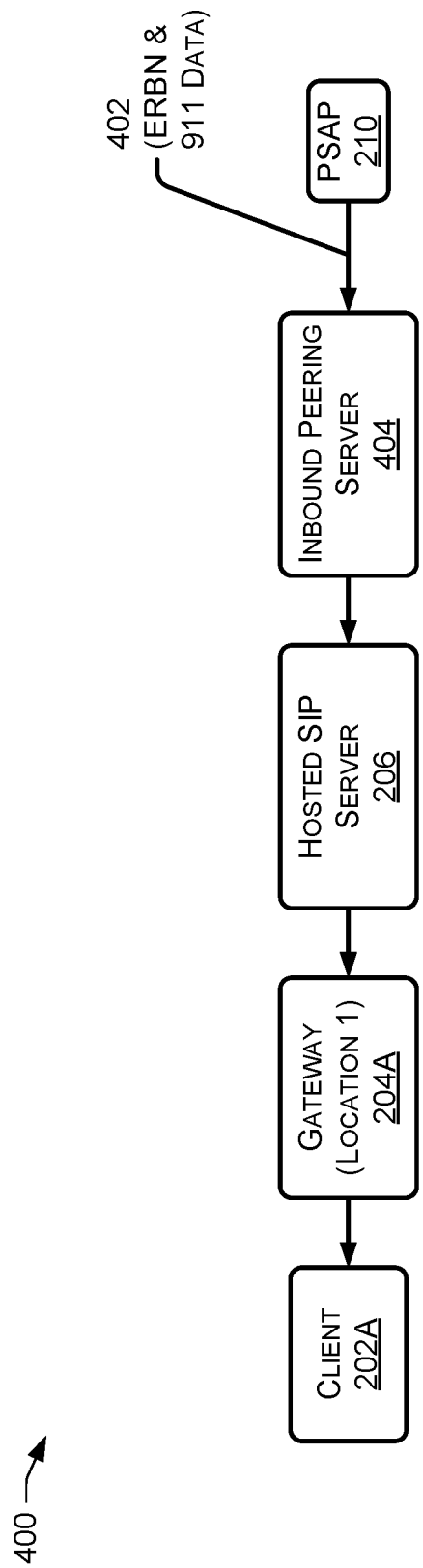
FIGS. 4A and 4B are block diagrams showing illustrative environments for a Public Safety Answering Point (PSAP) calling back an individual using a shared line that has been assigned an ERBN.
Figure 4B:
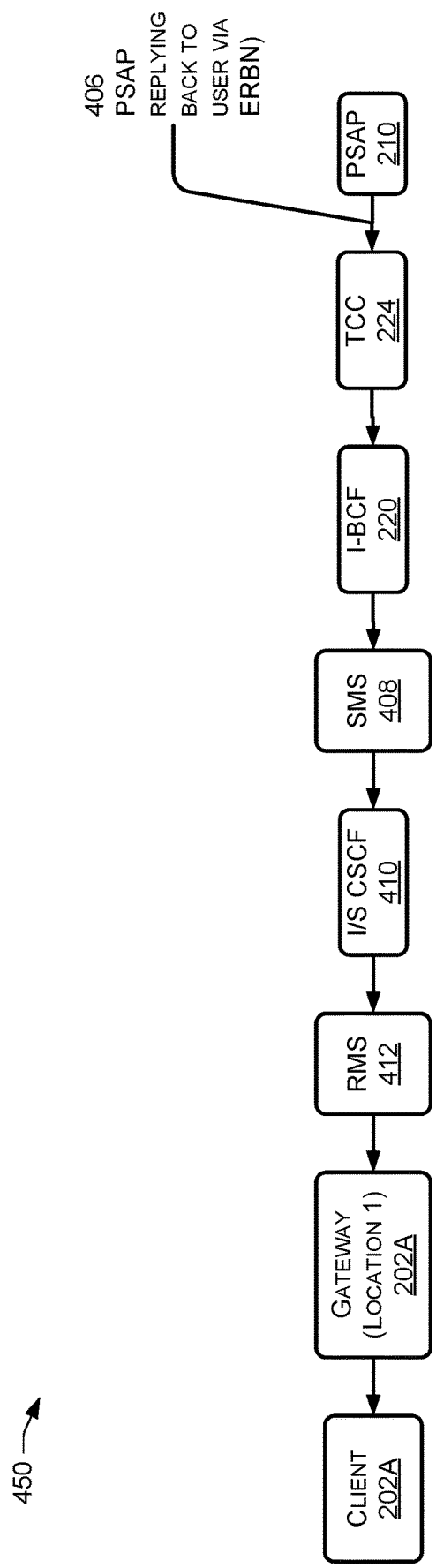

FIGS. 4A and 4B are block diagrams showing illustrative environments 400 and 450 for flows for a Public Safety Answering Point (PSAP) 210 calling back or messaging back an individual using a shared line that has been assigned an ERBN. As illustrated in environment 400, a PSAP 210 associated with the PSAB 210 calls back a client 202A that had an ERBN mapped to it in response to making an emergency call. In the current example, users in a shared group that may be associated with the caller that made the emergency call will not receive the call back from the PSAP 210. Instead, the specific user (e.g., client 202A) that made the call will receive the call back on the device utilized to contact the PSAP 210. According to some configurations, the inbound peering server 404 receives the call data 402 from PSAP 210 that communicates with server 206. As discussed above, the hosted SIP server 206 may store an identifier of the device/user that made the emergency call and create a binding with the ERBN such that when receiving the call from PSAP 210, the call may be routed to client 202A.

FIG. 4B illustrates the PSAP 210 communicating with the client 202A via electronic message 406. As illustrated, the I-BCSF 220 may communicate the message 406 with a message service, such as short messaging service (SMS) 408. SMS 408 communicates with the Interrogating-CSCF (I-CSCF) and/or the Serving CSCF (S-CSCF). Generally, the I-CSCF is responsible for routing of SIP messages to the appropriate S-CSCF (Serving CSCF) for a given client 202. Routing SIP requests arriving from other SIP networks may also be performed by the I-CSCF. The S-CSCF is a SIP server that is configured to perform session control. A combination of the I-CSCF and the S-CSCF make up the I/S-CSCF 410. The I/S-CSCF 410 communicates with rich messaging service (RMS) 412 that communicates the message 406 from PSAP 210 to client 202A.

Figure 5:
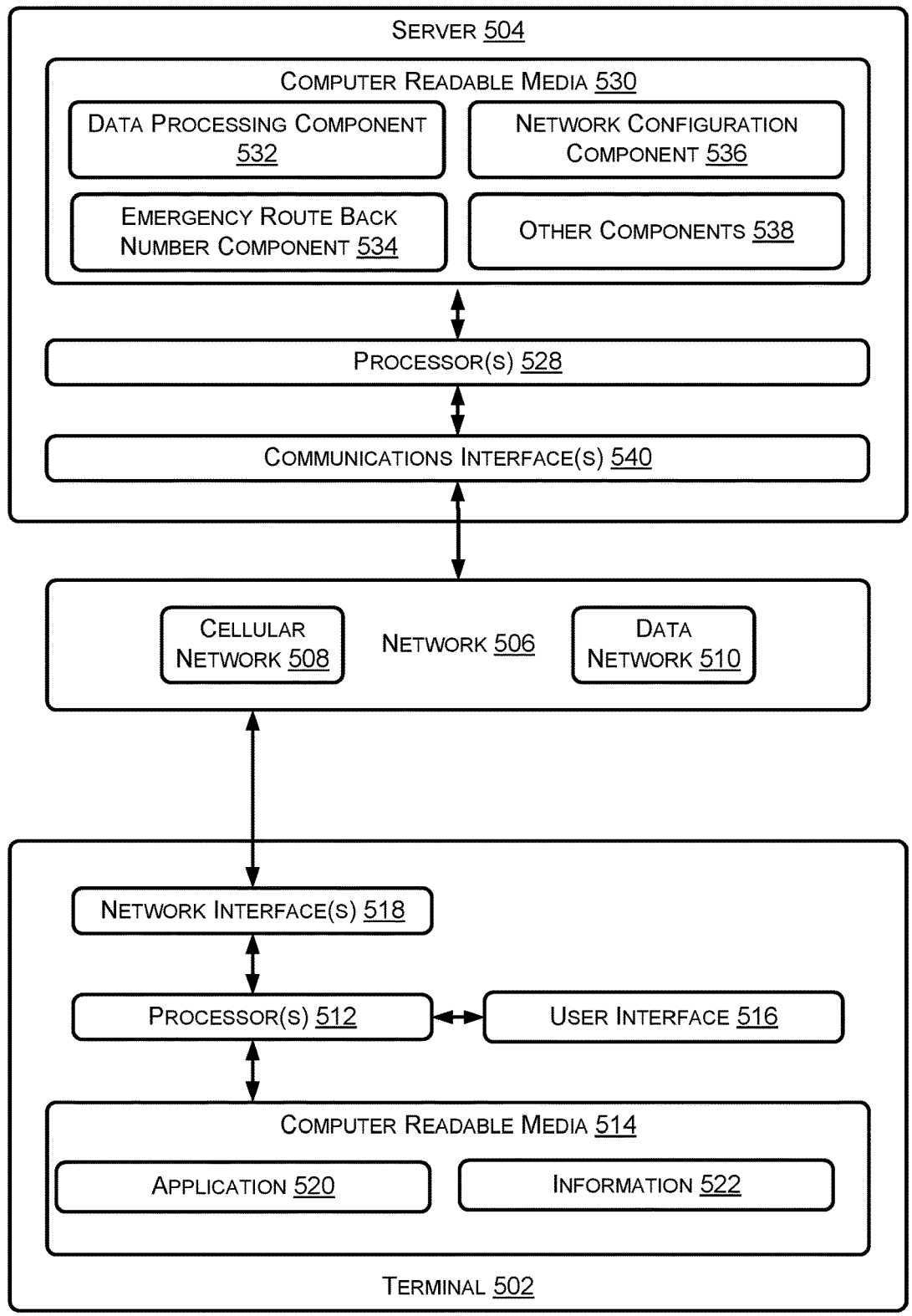
FIG. 5 is a block diagram illustrating a system that includes one or more components for temporary assignment of an emergency route back number (ERBN).

FIG. 5 is a block diagram illustrating a system 500 that includes one or more components for temporary assignment of an emergency route back number (ERBN) according to some implementations. The system 500 includes a terminal 502, which can represent a UE 110, or another computing device, coupled to a server 504, via a network 506. The server 504 can represent a computing device, such as one or more of the servers within the network 102 and/or access network 122, and/or some other computing device. The network 506 can represent network 102 and/or access network 122, or some other network.

The network 506 can include one or more networks, such as a cellular network 508 and a data network 510. The network 506 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 5G, 4G, 5G, WIFI, or other networks.

The cellular network 508 can provide wide-area wireless coverage using a technology such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 504 and terminals such as the terminal 502 can additionally or alternatively be performed using other technologies, such as wired (Plain Old Telephone Service, POTS, or PSTN lines), optical (e.g., Synchronous Optical NETwork, SONET) technologies, and the like.

The data network 510 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 504 includes or is communicatively connected with an IWF or other device bridging networks, e.g., LTE, 5G, and POTS networks. In some examples, the server 504 can bridge SS7 traffic from the PSTN into the network 506, e.g., permitting PSTN customers to place calls to cellular customers and vice versa.

In some examples, the cellular network 508 and the data network 510 can carry voice or data. For example, the data network 510 can carry voice traffic using VoIP or other technologies as well as data traffic, or the cellular network 508 can carry data packets using HSPA, LTE, or other technologies as well as voice traffic. Some cellular networks 508 carry both data and voice in a PS format. For example, many LTE networks carry voice traffic in data packets according to the VoLTE standard. Various examples herein provide origination and termination of, e.g., carrier-grade voice calls on, e.g., networks 506 using CS transports or mixed VoLTE/3G transports, or on terminals 302 including OEM handsets and non-OEM handsets.

The terminal 502 can be or include a wireless phone, a wired phone, a tablet computer, a laptop computer, a wristwatch, or other type of terminal. The terminal 502 can include one or more processors 512, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 514, such as memory (e.g., random access memory (RAM), solid state drives (SSDs), or the like), disk drives (e.g., platter-based hard drives), another type of computer-readable media, or any combination thereof. The CRM or other memory of terminal 502 can hold a datastore, e.g., an SQL or NoSQL database, a graph database, a BLOB, or another collection of data. The terminal 502 can further include a user interface (UI) 516, e.g., including an electronic display device, a speaker, a vibration unit, a touchscreen, or other devices for presenting information to a user and receiving commands from the user. The terminal 502 can further include one or more network interface(s) 518 configured to selectively communicate (wired or wirelessly) via the network 506, e.g., via an access network 122.

The CRM 514 can be used to store data and to store instructions that are executable by the processors 512 to perform various functions as described herein. The CRM 514 can store various types of instructions and data, such as an operating system, device drivers, etc. The processor-executable instructions can be executed by the processors 512 to perform the various functions described herein.

The CRM 514 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 512. Tangible computer-readable media can include volatile and nonvolatile, removable and non-removable media implemented in any method or technology for storage of information, such as computer readable instructions, data structures, program components, or other data.

The CRM 514 can include processor-executable instructions of an application 520. The CRM 514 can store information 522 identifying the terminal 502. The information 522 can include, e.g., an IMEI, an IMSI identifying the subscriber using terminal 502, or other information discussed above. The CRM 514 can additionally or alternatively store credentials (omitted for brevity) used for access, e.g., to IMS or RCS services.

The server 504 can include one or more processors 528 and one or more CRM 530. The CRM 530 can be used to store processor-executable instructions of a data processing component 532, an emergency route back number component 534 which may be emergency route back number component 118, a network configuration component 536, as well as one or more other components 538. The processor-executable instructions can be executed by the one or more processors 528 to perform various functions described herein.

In some examples, server 504 can communicate with (e.g., is communicatively connectable with) terminal 502 or other devices via one or more communications interface(s) 540, e.g., network transceivers for wired or wireless networks, or memory interfaces. Example communications interface(s) 540 can include ETHERNET or FIBRE CHANNEL transceivers, WIFI radios, or DDR memory-bus controllers (e.g., for DMA transfers to a network card installed in a physical server 504).

In some examples, processor 512 and, if required, CRM 514, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 528 and, if required, CRM 530.

Example Process

Figure 6:
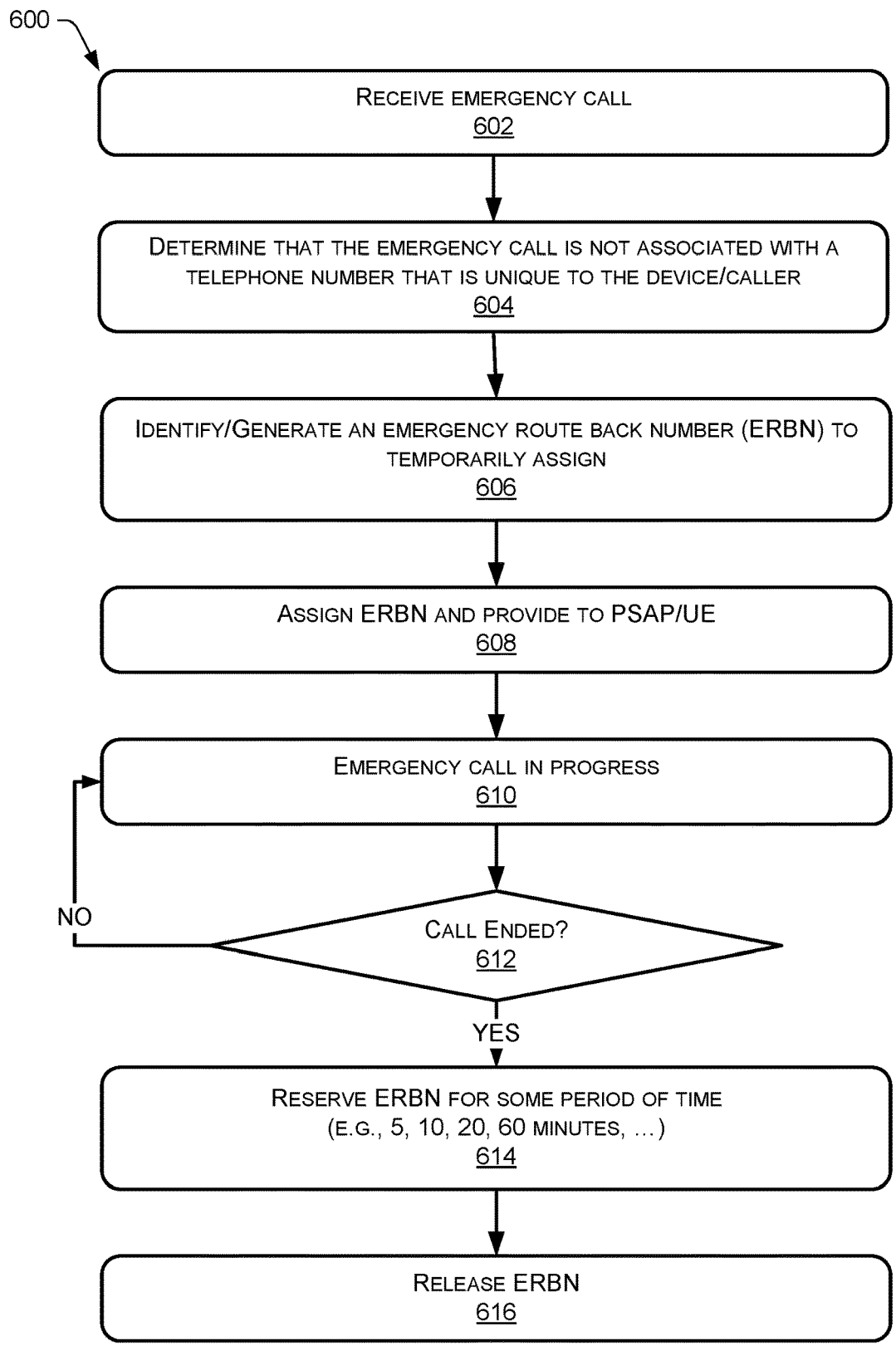
FIG. 6 is a flow diagram of an example process that includes temporary assignment of an emergency route back number (ERBN), according to some implementations

FIG. 6 illustrates an example process. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example process for includes temporary assignment of an emergency route back number (ERBN). The process includes, at 602, receiving an emergency call. As discussed above, the emergency call may be received by a telecommunication network, such as access network 122, core network 102, associated with a wireless service provider.

At 604, a determination is made that the emergency call was made from a device that is associated with a unique telephone number that is unique to the device/caller. As discussed above, the emergency call may be made from a device, such as UE 110A, that is not associated with a dedicated phone number that is unique to the user and/or the device, such as a shared line, or a communication that utilizes some other indicator to establish the emergency call (e.g., an email address, or some other identifier). In some examples, a gateway 204 coupled to the UE 110 is configured to determine that the UE 110A has a non-unique number.

At 606, an ERBN is identified/generated. As discussed above, the emergency route back number component 118 may obtain an ERBN 120 from a pool of available ERBNs or generate or identify an ERBN using some other technique or mechanism. According to some configurations, a SIP server 206 obtains/generates an ERBN for the UE 110A.

At 608, the ERBN is assigned. As discussed above, the ERBN component 118 may associate the identified ERBN 120 with the device and user that originated the call. According to some configurations, the server 206 stores a mapping between the UE 110A and the temporary ERBN associated with the UE 110A. The server 206 may provide the ERBN for UE 110A to the PSAP 210 and/or the client 202A that is associated with the UE 110A.

At 610, the user associated with the UE 110A is connected with the PSAP 210 and the emergency call is in progress. As discussed above, the ERBN that has been associated with the UE 110A making the emergency call is provided by the server 206 to the PSAP 210.

At decision block 612, a determination is made as to whether the emergency call has ended. When the emergency call has not ended, the process returns to 610. When the emergency call has ended, the process moves to 614.

At 614, the ERBN is reserved for some period of time after the emergency call has ended. As discussed above, the ERBN component 118 may reserve the ERBN number after an emergency call has ended for some period of time. According to some configurations, the ERBN component 118 may utilize a timer to determine when to release the ERBN. In this way, the ERBN remains alive/mapped to the user making the emergency call in case emergency services need to contact the caller back again. In some configurations, if the user who has this number reserved/mapped to their profile and their device IDs (Universal Unique Identifier (UUID)) and makes another 911 call; then the timer for the reserved ERBN gets restarted. This timer would restart each time they call back out to 911 and or receive a call back. This is to help to keep the ERBN alive for the immediate need of the emergency.

At 616, the ERBN is released. As discussed above, the ERBN component 118 and/or the server 206 may release the ERBN such that it may be utilized by another device and/or the same UE 110 for another emergency call.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
   one or more processors;
   a memory; and
   one or more components stored in the memory and executable by the one or more processors to perform operations comprising:
   receiving, from a user equipment (UE) associated with a wireless telecommunications network, a request to establish an emergency call with a Public Safety Answering Point (PSAP);
   identifying that the UE is associated with a non-unique telephone number, and the non-unique telephone number is associated with a hunt group;
   temporarily associating an emergency route back number (ERBN) with the UE during the emergency call and at least for at least a period of time after the emergency call has ended;
   in response to receiving a subsequent request from the UE to establish a subsequent emergency call with the PSAP prior to an expiry of the period of time after the emergency call has ended, re-starting the predetermined period of time; and
   removing the association of the ERBN with the UE upon an occurrence of one or more events after the subsequent emergency call has ended.

2. The system of claim 1, wherein associating the ERBN with the UE comprises obtaining the ERBN from a group of available ERBNs.

3. The system of claim 1, wherein the operations further comprise providing the ERBN to one or more of the PSAP and the UE.

4. The system of claim 1, wherein the operations further comprise determining that the subsequent emergency call has ended and maintaining the association of the ERBN with the UE for the period of time.

5. The system of claim 4, wherein removing the association of the ERBN with the UE upon the occurrence of the one or more events comprises determining that the period of time has passed after the subsequent emergency call has ended and removing the association.

6. The system of claim 1, wherein removing the association of the ERBN with the UE comprises returning the ERBN to a pool of ERBNs that are available for assignment by a component within the wireless telecommunications network.

7. A method comprising
   receiving, from an over-the-top (OTT) client of a user equipment (UE) associated with a wireless telecommunications network, a request to establish an emergency call;
   based on the emergency call being received from an OTT client, temporarily associating an emergency route back number (ERBN) with the UE during the emergency call and at least for at least a period of time after the emergency call has ended;
   in response to receiving a subsequent request from the OTT client to establish a subsequent emergency call prior to an expiry of the period of time after the emergency call has ended, re-starting the predetermined period of time; and
   removing the association of the ERBN with the UE upon an occurrence of one or more events after the subsequent emergency call has ended.

8. The method of claim 7, wherein associating the ERBN with the UE, comprises one or more of generating the ERBN and obtaining the ERBN from a group of available ERBNs.

9. The method of claim 7, further comprising providing the ERBN to one or more of a Public Safety Answering Point (PSAP) and the UE.

10. The method of claim 7, further comprising determining that the subsequent emergency call has ended and maintaining the association of the ERBN with the UE for the period of time.

11. The method of claim 10, wherein removing the association of the ERBN with the UE upon the occurrence of the one or more events comprises determining that the period of time has passed after the subsequent emergency call has ended and removing the association.

12. The method of claim 7, wherein removing the association of the ERBN with the UE comprises returning the ERBN to a pool of ERBNs that are available for assignment by a component within the wireless telecommunications network.

13. A non-transitory computer storage medium having programming instructions stored thereon that, when executed by a computer system, cause the computer system to perform operations comprising:
   receiving, from a user equipment (UE) associated with a wireless telecommunications network, a request to establish an emergency call with a Public Safety Answering Point (PSAP);
   identifying that the UE is associated with a non-unique telephone number, and the non-unique telephone number is associated with a hunt group;
   temporarily associating an emergency route back number (ERBN) with the UE during the emergency call and at least for at least a period of time after the emergency call has ended;
   in response to receiving a subsequent request from the UE to establish a subsequent emergency call with the PSAP prior to an expiry of the period of time after the emergency call has ended, re-starting the predetermined period of time; and
   removing the association of the ERBN with the UE upon an occurrence of one or more events after the subsequent emergency call has ended.

14. The non-transitory computer storage medium of claim 13, wherein associating the ERBN with the UE comprises obtaining the ERBN from a group of available ERBNs.

15. The non-transitory computer storage medium of claim 13, wherein the operations further comprise providing the ERBN to one or more of the PSAP and the UE.

16. The non-transitory computer storage medium of claim 13, wherein the operations further comprise determining that the subsequent emergency call has ended and maintaining the association of the ERBN with the UE for the period of time.

17. The non-transitory computer storage medium of claim 16, wherein removing the association of the ERBN with the UE upon the occurrence of the one or more events comprises determining that the period of time has passed after the subsequent emergency call has ended and removing the association.

18. The non-transitory computer storage medium of claim 13, wherein removing the association of the ERBN with the UE comprises returning the ERBN to a pool of ERBNs that are available for assignment by a component within the wireless telecommunications network.

\* \* \* \* \*